United States Patent [19]
Patti

[11] 3,943,417
[45] Mar. 9, 1976

[54] COMPRESSION TRIMMER

[75] Inventor: Vincent J. Patti, Norridge, Ill.

[73] Assignee: Standex International Corporation, Andover, Mass.

[22] Filed: Feb. 11, 1974

[21] Appl. No.: 441,424

[52] U.S. Cl. .......................... 317/249 R; 317/101 C
[51] Int. Cl.² .......................................... H01G 5/16
[58] Field of Search ......... 317/242, 101 C, 101 CC, 317/249 R, 261, 249 D; 29/490, 491

[56] References Cited
UNITED STATES PATENTS

| | | | |
|---|---|---|---|
| 1,801,203 | 4/1931 | Leece | 317/249 R |
| 2,179,068 | 11/1939 | Sprague | 317/249 R |
| 2,201,725 | 5/1940 | Godsey | 317/249 R |
| 3,011,138 | 11/1961 | Antaler | 317/242 X |
| 3,059,152 | 10/1962 | Khouri | 317/101 C |
| 3,439,233 | 4/1969 | Braiman | 317/101 CC |
| 3,530,422 | 9/1970 | Goodman | 317/101 CC |
| 3,751,725 | 8/1973 | Staurou | 317/249 R |

FOREIGN PATENTS OR APPLICATIONS

| | | | |
|---|---|---|---|
| 491,642 | 9/1938 | United Kingdom | 317/249 R |
| 863,639 | 3/1961 | United Kingdom | 317/249 R |

OTHER PUBLICATIONS

Encyclopedia of Polymer Science & Technology, Wiley & Sons, N.Y. 1970, Vol. 10, p. 471, Vol. 11, p. 458.

*Primary Examiner*—E. A. Goldberg
*Attorney, Agent, or Firm*—Mason, Kolehmainen, Rathburn & Wyss

[57] ABSTRACT

A compression trimmer for providing a range of capacitance values for an electrical circuit includes a plurality of capacitive plates spaced by one or more dielectric members and mounted on a substantially compliant, high temperature, molded plastic insulating base. The compression trimmer includes an elongated screw received within and threadedly engaging an elongated torque control hole of the compliant base. The length and diameter of the torque control hole may be ajdusted to provide a desired torque rating of the screw. Additionally, the improved interference fit between the screw and the compliant base reduces or eliminates screw vibration to thereby maintain the capacitance value of the trimmer constant. A plurality of conductive terminals extending through the compliant base are provided for connecting the trimmer in an electrical circuit, for example, by the soldering of the conductive terminals to a printed circuit board. The trimmer includes various protective features that reduce the possibility of damage or destruction of the trimmer resulting from the receipt of solder flux or solder within the base of the trimmer. These productive features include the maintenance of very close tolerances between the compliant base and the conductive terminals. Additionally, a plurality of hollowed-out portions or wells are formed in the compliant base immediately adjacent the conductive terminals for receiving and providing a cooling space for the solder flux and the solder that does enter the base 24 to thereby prevent the solder flux and the solder from damaging the capacitive plate structure of the trimmer.

36 Claims, 9 Drawing Figures

U.S. Patent  March 9, 1976  Sheet 1 of 2  3,943,417
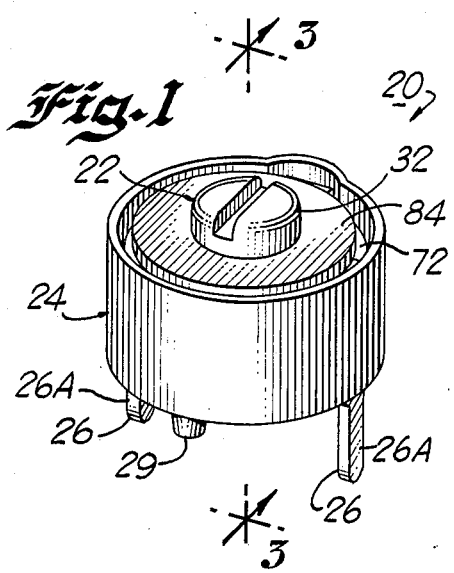
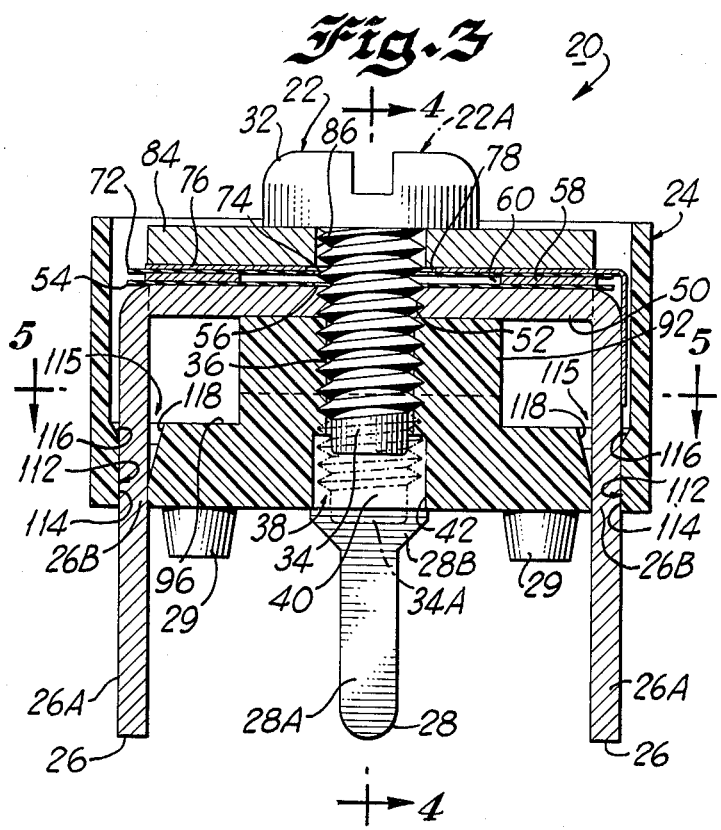
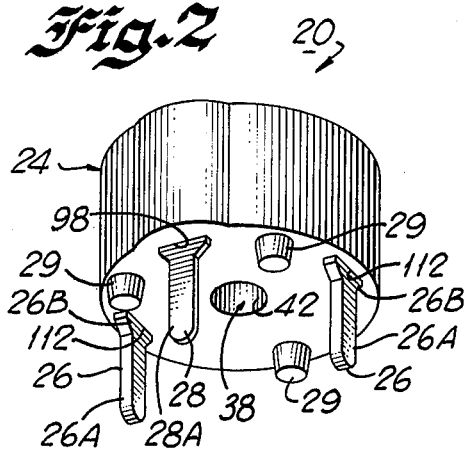
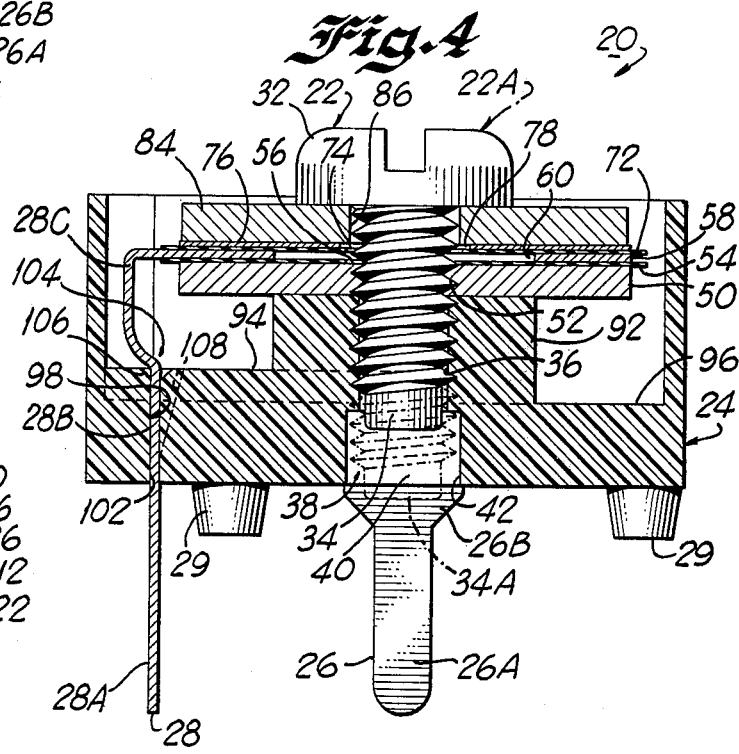
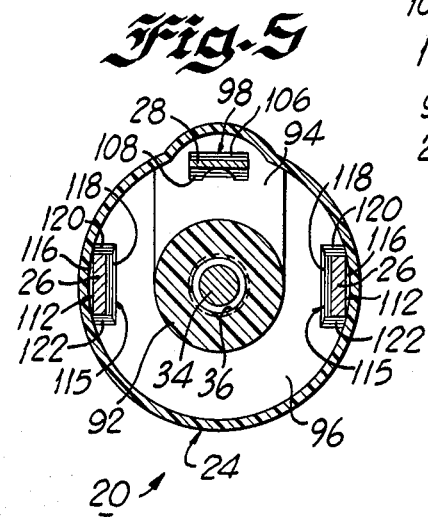

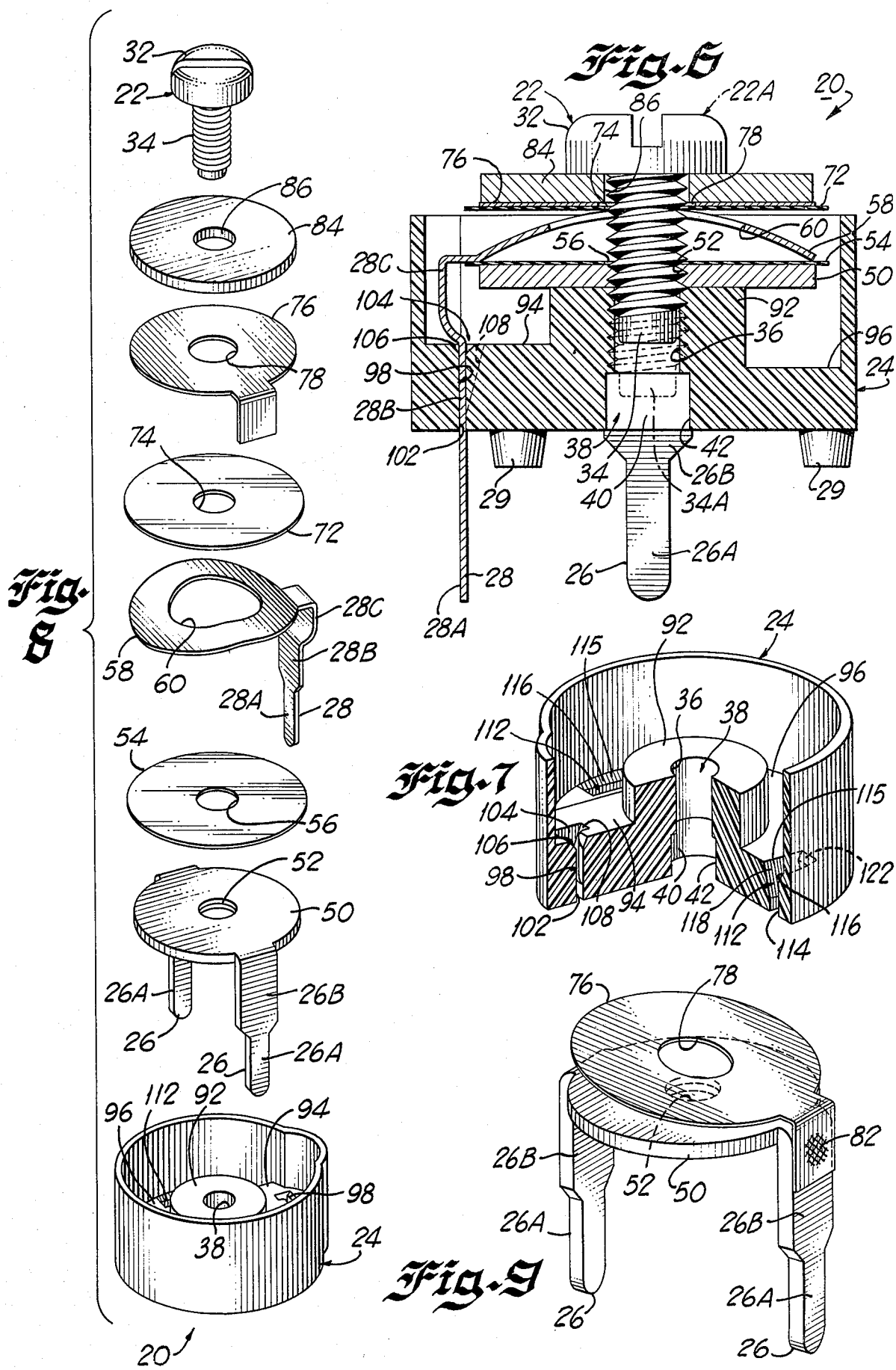

COMPRESSION TRIMMER

BACKGROUND OF THE INVENTION

A. Field of the Invention

The device of the present invention generally relates to variable capacitors that provide a variable compressive force to a pair of spaced capacitive plates to vary the capacitance value of such capacitors by varying the spacing between the capacitive plates. Such variable capacitors are commonly referred to as compression trimmers.

B. Description of the Prior Art

Compression trimmers are well known in the prior art and are used in radio circuits and other similar electrical circuits to provide small ranges of capacitance values for such electrical circuits. Typically, compression trimmers are connected in electrical circuits by being soldered to printed circuit boards. The soldering of relatively small or miniature prior art compression trimmers to printed circuit boards often results in a deterioration in their electrical characteristics resulting from the presence of solder flux or solder in their capacitive plate structures. Solder flux and solder are often drawn by capillary action along the relatively short conductive terminals of such miniature compression trimmers to their capacitive plate structures during a soldering operation. The problem does not often occur for relatively large compression trimmers due to the substantially greater spacing of such relatively large compression trimmers from printed circuit boards.

An additional problem often encountered in the field of compression trimmers stems from the attempts to provide specific torque ratings for the rotating trimmer screws of typical compression trimmers. Many devices have been used to provide such torque ratings. Such devices are typically characterized by their notable lack of precision and simplicity.

SUMMARY OF THE INVENTION

An object of the present invention is to provide a new and improved electrical device.

Another object of the present invention is to provide a new and improved capacitor.

Another object of the present invention is to provide a new and improved variable capacitor of the compression trimmer type.

Another object of the present invention is to provide a new and improved compression trimmer having novel means for providing a desired torque rating for rotating an adjustable trimmer screw.

Another object of the present invention is to provide a new and improved, relatively small or miniature compression trimmer having novel protective features for reducing the possibility of damage to the compression trimmer as a result of the soldering of the compression trimmer to a printed circuit board.

Briefly, the device of the present invention comprises a variable capacitor or compression trimmer for providing a relatively small range of capacitance values for an electrical circuit. The compression trimmer includes a plurality of capacitive plates spaced by one or more dielectric members and mounted on a substantially compliant, high temperature, molded plastic insulating base. The compression trimmer includes an elongated trimmer screw that is received within and threadedly engages an elongated torque control hole of the compliant base and that provides a variable compressive force to the capacitive plates to vary the spacing between the capacitive plates. By varying the spacing between the capacitive plates, the capacitance value of the compression trimmer is varied.

Additionally, by varying the length of the inner diameter of the torque control hole or both, the torque rating of the trimmer screw may be varied. The improved interference fit between the compliant base of the compression trimmer and the threaded trimmer screw received therein reduces the possibility of drift in the capacitance value of the compression trimmer.

The compression trimmer includes various protective features that prevent the deterioration or destruction of its capacitive plate structure during a typical soldering operation in which the compression trimmer is electrically connected to a printed circuit board. Very close tolerances are provided between the compliant base and the conductive terminals extending therethrough to reduce the amount of solder flux or solder that may enter the compliant base during a soldering operation. Additionally, one or more hollowed-out portions or wells are provided in the compliant base adjacent each of the conductive terminals to provide a discontinuation of the capillary path and to provide a reservoir and cooling space for any solder flux or solder that may enter the compliant base. By capturing and confining the solder flux or solder in the hollowed-out portions or wells, the presence of solder flux or solder in the capacitive plate structure of the compression trimmer is prevented.

BRIEF DESCRIPTION OF THE DRAWING

The above and other objects and advantages and novel features of the present invention will become apparent from the following detailed description of an embodiment of the invention illustrated in the accompanying drawing wherein:

FIG. 1 is an upper, front perspective view of a preferred embodiment of a variable capacitor or compression trimmer constructed in accordance with the principles of the present invention;

FIG. 2 is a lower, rear perspective view of the device of FIG. 1;

FIG. 3 is an enlarged, cross-sectional view of the device of FIG. 1 taken along line 3—3 of FIG. 1;

FIG. 4 is an enlarged, cross-sectional view of the device of FIG. 1 taken along line 4—4 of FIG. 3;

FIG. 5 is a cross-sectional view of the device of FIG. 1 taken along line 5—5 of FIG. 3;

FIG. 6 is an enlarged, cross-sectional view, similar to the view of FIG. 4, illustrating the device of FIG. 1 in an assembled, noncompressed condition;

FIG. 7 is an enlarged, partially cut-away, perspective view of a portion of the device of FIG. 1;

FIG. 8 is an enlarged, exploded, perspective view of the device of FIG. 1; and

FIG. 9 is an enlarged, perspective view of a portion of the device of FIG. 1.

DESCRIPTION OF THE PREFERRED EMBODIMENT

Referring to the drawing and initially to FIGS. 1 and 2, there is illustrated a new and improved, relatively small or miniature variable capacitor or compression trimmer 20 constructed in accordance with the principles of the present invention. The trimmer 20 may be inserted in an electrical circuit to provide a variable amount of capacitance for that circuit. The capacitance of the trimmer 20 may be set or varied by rotating a trimmer screw 22 that is received within and threadedly engages a substantially compliant, high temperature, molded plastic insulating base 24. In a preferred embodiment, the base 24 is formed from polypropylene and the screw 22 is formed from steel and is nickel plated prior to its assembly in the trimmer 20.

The trimmer 20 includes a plurality of conductive terminals 26 electrically connected to at least one of the capacitive plates of the trimmer 20 and a conductive terminal 28 electrically connected to a different one of the capacitive plates of the trimmer 20. The terminals 26 and 28 are used to electrically connect the trimmer 20 in an electrical circuit, for example, by the soldering of the terminals 26 and 28 to a printed circuit board. In order to properly space the trimmer 20 above a printed circuit board, the base 24 includes a plurality of integrally formed spacing posts 29.

More specifically, with respect to FIGS. 3-9, the screw 22 of the trimmer 20 includes a screw head 32 engageable by an adjusting tool, such as a screwdriver, and an elongated threaded shank portion 34 that is received within and threadedly engages a portion 36 of the inner surface of an elongated torque control hole 38 of the base 24. The torque control hole 38 further includes an elongated undercut portion 40 having an inner surface 42 that is not threadedly engaged by the threaded shank portion 34 of the screw 22. The improved interference fit between the portion 34 of the screw 22 and the portion 36 of the torque control hole 38 of the compliant base 24 reduces the possibility of undesired rotational movements of the screw 22 resulting from accident physical vibrations transmitted to the trimmer 20 to thereby reduce the possibility of an undesired change in the capacitance value of the trimmer 20 from its preset value.

In accordance with an important feature of the present invention, the torque rating for rotating the screw 22 may be varied and set to a desired level by adjusting either the inner diameter of the portion 36 of the torque control hole or by adjusting the length of the undercut portion 40 or by adjusting both. Increasing or decreasing the inner diameter of the portion 36, decreases or increases, respectively, the torsional force required to rotate the screw 22 in the torque control hole 38 due to the decrease or increase respectively, in the amount of surface area of the threaded shank portion 34 contacted by the compliant base 24. Similarly, increasing or decreasing the length of the undercut portion 40 of the torque control hole 38, decreases or increases, respectively, the torsional force required to rotate the screw 22 in the torque control hole 38 for the same reason.

The torque rating of the screw 22 could also conceivably be adjusted by utilizing screws 22 having slightly larger or smaller outer diameter threaded shank portions 34. Preferably, a specific torque rating for a screw 22 is achieved by maintaining both the outer diameters of the threaded shank portions 34 of screws 22 and the inner diameters of portions 36 of torque control holes 38 constant and by merely varying the lengths of the undercut portions 40.

The dotted line portions of FIGS. 3, 4 and 6 depict an embodiment of the present invention in which a substantially constant torsional force is required to be applied to a screw 22A in advancing the screw 22A from its position illustrated in FIG. 6 to its position illustrated in FIGS. 3 and 4. In an alternate embodiment of the present invention as illustrated in the solid line portions of FIGS. 3, 4, and 6, a screw 22 is disclosed as having a substantially shorter threaded shank portion 34 than a corresponding portion 34A of the screw 22A to thereby require a minimal initial amount and a substantially continuously increasing amount of torsional force to be applied to the screw 22 in advancing the screw 22 within the torque control hole 38 from the position illustrated in FIG. 6 to its position illustrated in FIGS. 3 and 4.

The trimmer 20 further includes a substantially rigid first capacitive plate or ground plate 50 having a centrally disposed threaded aperture 52 that receives and threadedly engages the threaded shank portion 34 of the screw 22. In a preferred embodiment, the plate 50 is formed from a 0.025 inch thick brass plate that is electro-tin plated prior to its assembly in the trimmer 20.

The plate 50 is electrically connected to an electrical circuit through the integrally formed terminals 26. Each of the terminals 26 preferably includes a relatively narrow lower portion 26A for soldering the terminal 26 to a printed circuit board and a substantially larger upper portion 26B for reducing the capillary attraction between the solder flux and the solder and the surface of the terminal 26 during a soldering operation. The portion 26B reduces the capillary attraction by providing an increased surface area of the terminal 26, simultaneously also providing a more effective heat sink for dissipating the heat present during a soldering operation.

Immediately positioned above the plate 50 is a first dielectric member or insulating washer 54 that includes a centrally disposed aperture 56 for passing the threaded shank portion 34 of the screw 22. In a preferred embodiment, the washer 54 is formed from mica with a thickness from 0.0005 to 0.003 inch, as determined by the desired capacitance range of the trimmer 20.

Immediately adjacent the washer 54 is a substantially resilient second capacitive plate or center plate 58 that includes a centrally disposed aperture 60, the inner diameter of which is also determined by the desired capacitance range of the trimmer 20. Preferably, the plate 58 assumes a generally arcuate shape (FIGS. 6 and 8) in a noncompressed condition. As the screw 22 is rotatably advanced through the threaded aperture 52 and the torque control hole 38 to increase the compressive force on the plates 50 and 58, the shape of the plate 58 becomes less arcuate and more planar to thereby reduce the physical spacing and the air between the opposed surface areas of the plates 50 and 58. As the compressive force on the plates 50 and 58 is reduced by rotating the screw 22 in an opposite direction, the shape of the plate 58 becomes less planar and more arcuate to increase the physical spacing and the air between the opposed surface areas of the plates 50 and 58.

In a preferred embodiment, the plate 58 is formed from a .008 inch thick sheet of brass and is spring-tempered and copper and electro-tin plated prior to its assembly in the trimmer 20. The inner diameter of the aperture 60 may vary from 0.109 to 0.218 inch depending upon the desired capacitance range of the trimmer 20.

The plate 58 is electrically connected to an electrical circuit through the integrally formed terminal 28. The terminal 28 preferably includes a relatively narrow lower portion 28A for soldering the terminal 28 to a printed circuit board and a substantially larger middle portion 28B for reducing the capillary attraction between the solder flux and the solder and the surface of the terminal 28 during a soldering operation. The portion 28B reduces the capillary attraction by providing an increased surface area of the terminal 28, simultaneously also providing a more effective heat sink for dissipating the heat present during a soldering operation. The terminal 28 also includes an axially offset upper portion 28C for properly aligning and positioning the plate 58 on the washer 54.

A second dielectric member or insulating washer 72 having a centrally disposed aperture 74 is disposed above the plate 58 to physically space and electrically insulate the plate 58 from a third capacitive plate or top plate 76. The washer 72 may be formed from the same material and in the same manner as the washer 54. The plate 76 includes a centrally disposed aperture 78 and is directly electrically connected to the plate 50 by any suitable means, such as a spot weld 82 (FIG. 9). The physical spacing and the air between the plate 58 and the plate 76 is reduced or increased to vary the capacitance of the trimmer 20 in substantially the same manner as set forth above with respect to the plates 50 and 58. In a preferred embodiment, the plate 76 is formed from 0.003 inch thick sheet of brass that is spring-tempered and electro-tin plated prior to assembly in the trimmer 20.

Positioned between the under surface of the screw head 32 and the plate 76 is a rigid compression washer 84 having a centrally disposed aperture 86. The washer 84 is used in conjunction with the plate 50 to apply a variable compressive force to the plate structure of the trimmer 20. In a preferred embodiment, the washer 82 is formed from a 0.031 inch thick sheet of steel and is nickel plated prior to assembly in the trimmer 20. In an alternate embodiment of the present invention in which the plate 76 is not included in the trimmer 20, the washer 84 is formed from a rigid dielectric material.

In accordance with an important feature of the present invention, the torque control hole 38 is formed in and the plate structure of the trimmer 20 is mounted on top of a generally centrally disposed, integrally molded, pedestal portion 92 of the base 24. The portion 92 is used to space the plate structure of the trimmer 20 above an upper interior plane or base portion 94 and a lower interior plane or base portion 96 of the base 24.

Opening onto the plane 94 is a hole or aperture 98 through the base 24. The aperture 98 permits the terminal 28 to pass through the base 24 to thereby electrically connect the plate 58 in an electrical circuit. The aperture 98 includes a lower portion 102 dimensioned to maintain a substantially tight contacting or sealing engagement between the base 24 and the terminal 28 to thereby reduce or eliminate the possibility of the entry of solder flux or solder within the base 24 as drawn by capillary action along the terminal 28 during a soldering operation. Disposed along the lower portion 102, the aperture 98 includes an upper, hollowed-out portion or well 104 formed by a plurality of generally downwardly sloping side walls 106 and 108 disposed on opposite sides of the terminal 28 and extending from the plane 94 to the lower portion 102 of the aperture 98. The well 104 provides a discontinuation of the capillary path along the terminal 28 and a storing and cooling space or reservoir for any solder flux or solder that does enter the base 24 as drawn by capillary action along the terminal 28 during a soldering operation. The well 104 thereby prevents such solder flux or solder from being drawn to the plate structure of the trimmer 20.

Similarly, opening onto the plane 96 are a pair of substantially identically formed holes or apertures 112 that permit the terminals 26 to pass through the base 24 to thereby electrically connect the plate 50 in an electrical circuit. Each of the apertures 112 includes a lower portion 114 dimensioned to maintain a substantially tight contacting or sealing engagement between the base 24 and one of the terminals 26 to thereby reduce or eliminate the possibility of the entry of solder flux or solder within the base 24 as drawn by capillary action along the terminal 26 during a soldering operation. Disposed above the lower portion 114, each of the apertures 112 also includes an upper, hollowed-out portion or well 115 formed by a plurality of generally downwardly sloping side walls 116, 118, 120 and 122 disposed on opposite sides of one of the terminals 26 and extending from the plane 96 to the lower portion 114 of one of the apertures 112. The wells 115 provide discontinuations of the capillary paths along the terminals 26 and storing and cooling spaces or reservoirs for any solder flux or solder that does enter the base 24 as drawn by capillary action along one or both of the terminals 26 during a soldering operation. The wells 115 thereby prevent such solder flux or solder from being drawn to the plate structure of the trimmer 20.

The planes 94 and 96 are positioned either at the same vertical level within the base 24 or at different vertical levels depending on the specific design of the trimmer 20. As depicted in the drawing, the plane 94 is generally disposed at a higher vertical level than the plane 96 to provide additional support or rigidity for the relatively thin terminal 28. Additionally, by disposing the planes 94 and 96 at different vertical levels, the possibility of the mixture or any overflow of solder flux or solder from the well 104 with any overflow of solder flux or solder from the wells 115 is reduced or eliminated. Thus, a possible cause for the electrical short circuiting of the trimmer 20 is eliminated.

Obviously, many modifications and variations of the present invention are possible in light of the above teachings. Thus, it is to be understood that, within the scope of the appended claims, the invention may be practiced otherwise than as specifically described.

What is claimed and desired to be secured by Letters Patent of the United States is:

1. A variable capacitor comprising
a first conductive capacitive plate,
a second conductive capacitive plate physically spaced from and electrically insulated from said first plate,
means for varying the spacing between said first and second plates to vary the capacitance value of said capacitor, said varying means comprising a rotatable screw having an elongated threaded shank portion,
means for physically supporting said first and second plates and for resiliently biasing said screw agains rotational movement, said supporting and biasing means comprising an insulating base formed from a compliant dielectric material, said base including means receiving said threaded shank portion, said receiving means comprising a first elongated aperture formed in said base, at least a first elongated portion of said first aperture having an inner diameter of a magnitude less than the magnitude of the outer thread diameter of said threaded shank portion prior to the receipt of said threaded shank portion to thereby enable the threaded engagement of said first elongated portion of said first aperture by said threaded shank portion and to thereby provide continuous torsional resistance to the rotational movement of said screw and to thereby prevent vibrational rotational movement of said screw during the operational life of said capacitor.

2. A variable capacitor as defined in claim 1 wherein said first elongated aperture includes a second elongated portion having an inner diameter of a magnitude greater than said magnitude of said outer thread diameter of said threaded shank portion, said second elongated portion being adjacent to and substantially coaxially aligned with said first elongated portion, the ratio between the axial lengths of said second elongated portion and said first elongated portion being variably preselectable to predetermine the magnitude of said resistance to the rotational movement of said screw.

3. A variable capacitor as defined in claim 1 further comprising
a first conductive terminal for electrically connecting said first plate into an electrical circuit,
a second conductive terminal for electrically connecting said second plate into an electrical circuit,
a second elongated aperture in said base through which said first terminal extends for connection to an electrical circuit and
a third elongated aperture in said base through which said second terminal extends for connection to an electrical circuit.

4. A variable capacitor as defined in claim 3 wherein said first terminal and said second terminal are integral portions of said first plate and said second plate, respectively.

5. A variable capacitor as defined in claim 3 wherein said first terminal includes a lowermost portion of a first cross-sectional area for physically engaging and for being directly electrically connected by a soldering operation to a printed circuit board.

6. A variable capacitor as defined in claim 5 wherein said first terminal includes an upper portion adjacent said lowermost portion of a second cross-sectional area, said second cross-sectional area being substantially greater than said first cross-sectional area.

7. A variable capacitor as defined in claim 3 wherein said second elongated aperture includes a lower portion having inner dimensions configured to enable the tight contacting or substantially sealing engagement of said base with said first terminal.

8. A variable capacitor as defined in claim 7 wherein said base includes a first, inner, generally planar surface and wherein said second elongated aperture includes first means for storing and cooling solder flux or solder that enters said base through said second elongated aperture, said first storing and cooling means comprising a first hollowed-out portion or well formed in said base extending from said first planar surface to said lower portion of said second elongated aperture.

9. A variable capacitor as defined in claim 8 wherein said third elongated aperture includes a lower portion having inner dimensions configured to enable a tight contacting or substantially sealing engagement of said base with said second terminal.

10. A variable capacitor as defined in claim 9 wherein said base includes a second, inner, generally planar surface and wherein said third elongated aperture includes second means for storing and cooling solder flux or solder that enters said base through said third elongated aperture, said second storing and cooling means comprising a second hollowed-out portion or well formed in said base extending from said second planar surface to said lower portion of said third elongated aperture.

11. A variable capacitor as defined in claim 10 further comprising a third conductive terminal for electrically connecting said first plate into an electrical circuit and a fourth elongated aperture in said base through which said third terminal extends for connection to an electrical circuit.

12. A variable capacitor as defined in claim 11 wherein said third terminal is an integral portion of said first plate and wherein said fourth elongated aperture includes a lower portion having inner dimensions configured to enable a tight contacting or substantially sealing engagement of said base with said third terminal.

13. A variable capacitor as defined in claim 12 wherein said fourth elongated aperture includes third means for storing and cooling solder flux or solder that enters said base through said fourth elongated aperture, said third storing and cooling means comprising a third hollowed-out portion or well formed in said base extending from said first planar surface to said lower portion of said fourth elongated aperture.

14. A variable capacitor as defined in claim 10 wherein said first well and said second well each include a plurality of sides that form acute angles with said first terminal and said second terminal, respectively.

15. A variable capacitor as defined in claim 10 wherein said first planar surface is disposed in said base on a first, generally horizontal plane and wherein said second planar surface is disposed in said base on a second, generally horizontal plane, said first plane being vertically spaced below said second plane.

16. A variable capacitor as defined in claim 10 wherein said base includes an integrally formed, generally centrally disposed, raised pedestal portion for positioning said first and second plates above said first and second planar surfaces.

17. A variable capacitor as defined in claim 16 wherein said first elongated aperture extends through said pedestal portion in the direction of the longitudinal axis of said pedestal portion.

18. A variable capacitor as defined in claim 10 further comprising a third conductive capacitive plate physically spaced from said first and second plates, electrically insulated from said second plate and directly electrically connected to said first plate.

19. A capacitor comprising
a first conductive capacitive plate,
a second conductive capacitive plate physically spaced from and electrically insulated from said first plate,
means for housing said first and second plates, said housing means comprising an insulating body formed from a dielectric material, said insulating body including a first, inner, generally planar surface,
a first conductive terminal for electrically connecting said first plate into an electrical circuit,
a second conductive terminal for electrically connecting said second plate into an electrical circuit, a first elongated aperture in said insulating body through which said first terminal extends for connection to an electrical circuit, a second elongated aperture in said insulating body through which said second terminal extends for connection to an electrical circuit, said first elongated aperture including a lower portion having inner dimensions configured to maintain a substantially tight or contacting sealing engagement between said insulating body and said first terminal to thereby reduce or eliminate the possibility of the entry of solder flux or solder within said insulating body through said first elongated aperture as drawn by capillary action along said first terminal during a soldering operation and including first means for storing and cooling solder flux or solder that enters said insulating body through said first elongated aperture, said first means for storing and cooling comprising a first hollowed-out portion or well formed in said insulating body extending from said first planar surface to said lower portion of said first elongated aperture.

20. A capacitor as defined in claim 19 wherein said second elongated aperture includes a lower portion having inner dimensions configured to maintain a substantially tight or contacting sealing engagement between said insulating body and said second terminal to thereby reduce or eliminate the possibility of the entry of solder flux or solder within said insulating body through said second elongated aperture as drawn by capillary action along said second terminal during a soldering operation.

21. A capacitor as defined in claim 20 wherein said insulating body includes a second, inner, generally planar surface and wherein said second elongated aperture includes second means for storing and cooling solder flux or solder that enters said insulating body through said second elongated aperture, said second means for storing and cooling comprising a second hollowed-out portion or well formed in said insulating body extending from said second planar surface to said lower portion of said second elongated aperture.

22. A capacitor as defined in claim 21 further comprising a third conductive terminal for electrically connecting said first plate into an electrical circuit and a third elongated aperture in said base through which said third terminal extends for connection to an electrical circuit.

23. A capacitor as defined in claim 22 wherein said third elongated aperture includes a lower portion having inner dimensions configured to maintain a substantially tight or contacting sealing engagement between said insulating body and said third terminal to thereby reduce or eliminate the possibility of the entry of solder flux or solder within said insulating body through said third elongated aperture as drawn by capillary action along said third terminal during a soldering operation.

24. A capacitor as defined in claim 23 wherein said third elongated aperture includes third means for storing and cooling solder flux or solder that enters said insulating body through said third elongated aperture, said third storing and cooling means comprising a third hollowed-out portion or well formed in said insulating body extending from said first planar surface to said lower portion of said third elongated aperture.

25. A capacitor as defined in claim 21 wherein said first well and said second well each include a plurality of sides that form acute angles with said first terminal and said second terminal, respectively.

26. A capacitor as defined in claim 21 wherein said first planar surface is disposed in said insulating body on a first, generally horizontal plane and wherein said second planar surface is disposed in said insulating body on a second, generally horizontal plane, said first plane being vertically spaced below said second pulse.

27. A capacitor as defined in claim 21 wherein said insulating body includes an integrally formed, generally centrally disposed, raised pedestal portion for positioning said first and second plates above said first and second planar surfaces.

28. A capacitor as defined in claim 21 further comprising a third elongated aperture extending through said pedestal portion in the direction of the longitudinal axis of said pedestal portion and means for varying the physical spacing between said first and second plates, said varying means comprising a rotatable screw having an elongated threaded shank portion positioned in said third elongated aperture.

29. A capacitor as defined in claim 28 wherein said insulating body includes means for providing substantial resistance to the rotational movement of said screw, said resistance providing means comprising the inner surface of at least a first elongated portion of said third elongated aperture, the inner diameter of said first elongated portion of said third elongated aperture being less than the outer thread diameter of said elongated threaded shank portion of said screw prior to the receipt of said threaded shank portion to thereby enable the threaded engagement of said insulating body by said screw.

30. A capacitor as defined in claim 29 wherein said dielectric material comprises a compliant dielectric material.

31. A capacitor as defined in claim 30 wherein said compliant dielectric material comprises polypropylene.

32. A capacitor as defined in claim 19 further comprising means for spacing said capacitor above the surface of a printed circuit board, said spacing means comprising a plurality of spacing posts integrally formed with said insulating body from said dielectric material and extending from an outer surface of said insulating body generally in the direction of said first and second terminals.

33. A compression trimmer comprising
a first conductive capacitive plate,
a second conductive capacitive plate physically spaced from and electrically insulated from said first plate,
means for applying a variable compressive force to the surfaces of said first and second plates, said compressive force applying means comprising a rotatable screw having an elongated threaded shank portion, and
means for housing said first and second plates and for resiliently biasing said screw against rotational movement, said housing and biasing means comprising an insulated body formed from a compliant dielectric material and having an elongated aperture of a fixed length through said insulating body receiving said threaded shank portion, said aperture including a first elongated portion having an inner surface of a diameter less than the outer thread diameter of said threaded shank portion prior to the receipt of said threaded shank portion to enable the threaded engagement of said insulating body by said screw and to thereby provide substantial resistance to the rotational movement of said screw.

34. A compression trimmer as defined in claim 33 wherein the magnitude of said resistance is generally inversely proportional to said diameter of said inner surface of said first elongated portion prior to the receipt of said threaded shank portion.

35. A compression trimmer as defined in claim 33 wherein said elongated aperture includes a second elongated portion substantially coaxially aligned with said first elongated portion and having an inner surface of a diameter greater than the outer thread diameter of said threaded shank portion, the sum of the axial lengths of said first and second elongated portions being equal to said fixed length of said elongated aperture.

36. A compression trimmer as defined in claim 35 wherein said magnitude of said resistance is generally directly proportional to the axial length of said first elongated portion and generally inversely proportional to the axial length of said second elongated portion.

* * * * *

PO-1050
(5/69)

UNITED STATES PATENT OFFICE
CERTIFICATE OF CORRECTION

Patent No. 3,943,417          Dated  March 9, 1976

Inventor(s) Vincent J. Patti

It is certified that error appears in the above-identified patent and that said Letters Patent are hereby corrected as shown below:

Claim 1, column 6, line 61, change "agains" to --against--; and
Claim 26, column 10, line 8, change "pulse" to --plane--.

Signed and Sealed this eleventh Day of May 1976

[SEAL]

Attest:

RUTH C. MASON
Attesting Officer

C. MARSHALL DANN
Commissioner of Patents and Trademarks